US012039807B2

(12) United States Patent
Wong et al.

(10) Patent No.: US 12,039,807 B2
(45) Date of Patent: Jul. 16, 2024

(54) SHAPE-BASED VEHICLE CLASSIFICATION USING LASER SCAN AND NEURAL NETWORK

(71) Applicant: Raytheon Company, Waltham, MA (US)

(72) Inventors: Harrison Wong, West Covina, CA (US); Kirk E. Hansen, Whittier, CA (US); Philip A. Sallee, South Riding, VA (US); Drasko Sotirovski, Point Roberts, WA (US); Ronald F. Vega, Chino Hills, CA (US); Jonathan Goldstein, Fredericksburg, VA (US)

(73) Assignee: Raytheon Company, Tewksbury, MA (US)

( * ) Notice: Subject to any disclaimer, the term of this patent is extended or adjusted under 35 U.S.C. 154(b) by 336 days.

(21) Appl. No.: 17/385,407

(22) Filed: Jul. 26, 2021

(65) Prior Publication Data

US 2022/0028180 A1     Jan. 27, 2022

Related U.S. Application Data

(60) Provisional application No. 63/057,055, filed on Jul. 27, 2020.

(51) Int. Cl.
*G07B 15/06*     (2011.01)
*G01C 5/00*     (2006.01)
(Continued)

(52) U.S. Cl.
CPC ............ *G07B 15/06* (2013.01); *G01C 5/00* (2013.01); *G01S 7/4865* (2013.01);
(Continued)

(58) Field of Classification Search
CPC ..... G07B 15/06; G06F 18/24137; G01C 5/00; G01S 7/4865; G01S 7/4876; G01S 17/10;
(Continued)

(56) References Cited

U.S. PATENT DOCUMENTS 5,278,423 A * 1/1994 Wangler ................. G01S 17/42
                                                              47/1.7
5,321,490 A * 6/1994 Olson ..................... G01S 7/486
                                                            356/5.03

(Continued)

FOREIGN PATENT DOCUMENTS

EP          2756484 A2    7/2014
WO    WO-2022026402 A1    2/2022

OTHER PUBLICATIONS

"International Application Serial No. PCT/US2021/043206, International Search Report mailed Nov. 9, 2021", 5 pgs.

(Continued)

*Primary Examiner* — Michael A Lyons
*Assistant Examiner* — Omar H Nixon
(74) *Attorney, Agent, or Firm* — Schwegman Lundberg & Woessner, P.A.

(57) ABSTRACT

Systems, devices, methods, and computer-readable media for. A method can include receiving, from a laser scan device of a tolling station, a time series of distance measurements, determining, based on the time series of distance measurements, height measurements indicating a height of a vehicle from a surface of a road. generating, based on the height measurements, an image of the height measurements, and classifying, using the image as input to a convolutional neural network (CNN), the vehicle.

18 Claims, 10 Drawing Sheets

(51) Int. Cl.
  *G01S 7/4865* (2020.01)
  *G01S 7/487* (2006.01)
  *G01S 17/10* (2020.01)
  *G01S 17/89* (2020.01)
  *G06F 18/2413* (2023.01)
  *G06N 3/08* (2023.01)
  *G08G 1/017* (2006.01)

(52) U.S. Cl.
  CPC ............ *G01S 7/4876* (2013.01); *G01S 17/10* (2013.01); *G01S 17/89* (2013.01); *G06F 18/24137* (2023.01); *G06N 3/08* (2013.01); *G08G 1/017* (2013.01); *G06V 2201/08* (2022.01)

(58) Field of Classification Search
  CPC .......... G01S 17/89; G06N 3/08; G08G 1/017; G06V 2201/08
  USPC ....................................................... 356/601
  See application file for complete search history.

(56) References Cited

U.S. PATENT DOCUMENTS

| | | | |
|---|---|---|---|
| 6,828,920 | B2 | 12/2004 | Owen et al. |
| 9,683,836 | B2 | 6/2017 | Sandhawalia et al. |
| 9,760,806 | B1* | 9/2017 | Ning .................... G06V 20/56 |
| 2002/0140924 | A1 | 10/2002 | Wangler et al. |
| 2003/0011492 | A1 | 1/2003 | Owen et al. |
| 2015/0046119 | A1 | 2/2015 | Sandhawalia et al. |
| 2017/0140253 | A1* | 5/2017 | Wshah .................... G06V 20/54 |
| 2018/0018590 | A1* | 1/2018 | Szeto .................... G16H 50/20 |
| 2019/0164047 | A1* | 5/2019 | ter Haar Romenij ........................ G06V 10/764 |
| 2019/0354857 | A1 | 11/2019 | Sallee et al. |
| 2021/0150283 | A1* | 5/2021 | Li ........................ G06F 18/217 |
| 2021/0224528 | A1* | 7/2021 | Mannby .................. G06F 17/16 |
| 2022/0129758 | A1 | 4/2022 | Sallee |

OTHER PUBLICATIONS

"International Application Serial No. PCT/US2021/043206, Written Opinion mailed Nov. 9, 2021", 7 pgs.

Athalye, Anish, et al., "Synthesizing Robust Adversarial Examples", International Conference on Machine Learning, (2018), 10 pgs.

Chidlovskii, Boris, et al., "Vehicle type classification from laser scans with global alignment kernels", 17th International IEEE Conference on Intelligent Transportation Systems (ITSC), IEEE, (Oct. 8, 2014), 2840-2845.

Coifman, Benjamin, et al., "Segmenting, Grouping and Tracking Vehicles in LiDAR Data", NEXTRANS Project No. 124OSUY2.1, (2004), 33 pgs.

Evtimov, Ivan, et al., "Robust Physical-World Attacks on Machine Learning Models", arXiv:1707.08945v2 [cs.CR], (Jul. 30, 2017), 10 pgs.

Guo, Chuan, et al., "On Calibration of Modern Neural Networks", arXiv:1706.04599v2 [cs.LG], (Aug. 3, 2017), 14 pgs.

Lee, Kimin, et al., "A Simple Unified Framework for Detecting Out-of-Distribution Samples and Adversarial Attacks", 32nd Conference on Neural Information Processing Systems, (2018), 11 pgs.

Lovas, T, et al., "Model-Based Vehicle Detection from LiDAR Data", Department of Photogrammetry and Geoinformatics—Budapest University of Technology & Economics, Center for Mapping—Ohio State University., (2004), 5 pgs.

Nguyen, Anh, et al., "Deep Neural Networks are Easily Fooled: High Confidence Predictions for Unrecognizable Images", Proceedings of the IEEE Conference on Computer Vision and Pattern Recognition, (2015), 427-436.

Sapre, Suchet, et al., "A Robust Comparison of the KDDCup99 and NSL-KDD IoT Network Intrusion Detection Datasets Through Various Machine Learning Algorithms", arXiv:1912.13204v1, (Dec. 2019), 8 pgs.

Song, Chufeng, et al., "Auto-encoder Based Data Clustering", CIARP, Part I, LNCS 8258, (2013), 117-124.

Tanner, Franklin, et al., "Overhead Imagery Research Data Set—An annotated data library and tools to aid in the development of computer vision algorithms", IEEE Applied Imagery Pattern Recognition Workshop, (2009), 1-8.

Xie, Junyuan, et al., "Unsupervised deep embedding for clustering analysis.", Proceedings of the 33rd International Conference on Machine Learning, (2016), 10 pgs.

"International Application Serial No. PCT/US2021/043206, International Preliminary Report on Patentability mailed Feb. 9, 2023", 9 pgs.

* cited by examiner

FIG. 5

SHAPE-BASED VEHICLE CLASSIFICATION USING LASER SCAN AND NEURAL NETWORK

RELATED APPLICATION

This application claims benefit of priority to U.S. Provisional Patent Application No. 63/057,055, titled "Shape-Based Vehicle Classification Using Laser Scan and Neural Network" and filed on Jul. 27, 2020, which is incorporated herein by reference in its entirety.

TECHNICAL FIELD

Embodiments described herein generally relate to machined learning (ML) model architectures for vehicle tolling.

BACKGROUND

Some current toll systems rely on axle sensors that are embedded in a roadway on which cars are travelling. The output of the axle sensors can be used to count the number of vehicles that have travelled the roadway. The output of the axle sensors can be used to inform a toll system on a proper amount of money to charge a car for using the roadway. The axel sensors have a finite life and are prohibitively expensive.

Other toll systems rely on cameras and image analysis to determine whether a vehicle is present and how much to charge a user. Environmental factors, such as precipitation, can adversely affect the operation of such toll systems.

BRIEF DESCRIPTION OF DRAWINGS

FIG. 5 illustrates, by way of example, a diagram of an embodiment of an image of measurement heights.

DETAILED DESCRIPTION

The following description and the drawings sufficiently illustrate teachings to enable those skilled in the art to practice them. Other embodiments may incorporate structural, logical, electrical, process, and other changes. Portions and features of some examples may be included in, or substituted for, those of other examples. Teachings set forth in the claims encompass all available equivalents of those claims.

Tolling operations can benefit from vehicle classification systems that are robust against vehicle shape and configuration variety, sometimes called vehicle design. Vehicle design evolves over time and many classification systems have not evolved to handle the variety.

Toll rates depend on vehicle type (e.g., motorcycle, axle count, trailer or no trailer, or the like). Vehicle design changes over time, but traditional business rules that characterize vehicle design cannot detect drift in vehicle design. A particular vehicle tolling system on a gantry on Cross Israel Highway in Israel, had an error rate of between 5 and 60% depending on vehicle class. Prior vehicle tolling systems can rely on a vehicle detection and classification (VDAC) subsystem. The VDAC subsystem is responsible for determining when a vehicle is present, a date/time the vehicle was present, and classifying the vehicle. Table 1 presents example classifications of vehicles.

TABLE

Example vehicle classifications for a vehicle toll station

| Class | Description |
|---|---|
| 1 | motorcycle |
| 2 | Passenger car |
| 3 | Four tire, single unit |
| 4 | bus |
| 5 | Two axle, six tire, single unit |
| 6 | Three axle, single unit |
| 7 | Four or more axle, single unit |
| 8 | Four or less axle, single trailer |
| 9 | Five axle, single trailer |
| 10 | Six or more axle single trailer |
| 11 | Five or less axle, multi-trailer |
| 12 | Six axle, multi-trailer |
| 13 | Seven or more axles, multi-trailer |

A vehicle classifier in accord with present embodiments can overcome one of more of the problems of the prior vehicle classification systems discussed. Embodiments can include a laser scan device angled downward toward incoming traffic coupled to a roadside collection unit (RCU), and a VDAC device. The RCU device can convert laser scan data from the laser scan device to an image. The RCU device can include a laser scan vehicle detection and framing algorithm to create three-dimensional 3D vehicle images. The RCU device can perform automated vehicle frame annotation to label images in accord with their classification. An informed pseudolabel (IPL), a semi-supervised training algorithm that identifies labeling errors in the dataset, can be leveraged to detect errors in the labels. The 3D image of the vehicle attributes can be classified by a convolutional neural network (CNN). This design allows one to use an autoencoder to classify vehicles based on the generated images.

Figure 1:
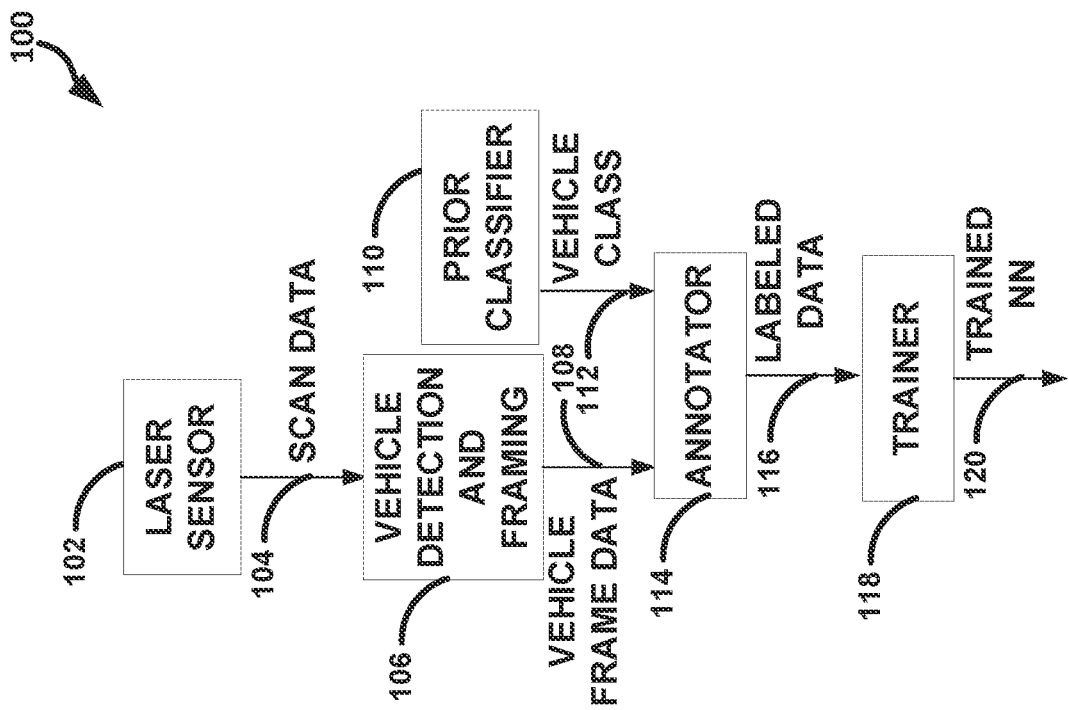
FIG. 1 illustrates, by way of example, a block diagram of an embodiment of a vehicle classification system.

FIG. 1 illustrates, by way of example, a block diagram of an embodiment of a vehicle classification system 100. The system 100 as illustrated includes a laser sensor 102, a vehicle detection and framing operator 106, a prior classifier 110, an annotator 114, and a neural network (NN) trainer 118. The laser sensor 102 can provide scan data 104 to the vehicle detection and framing operator 106. The vehicle detection and framing operator 106 can provide vehicle frame data 108 to the annotator 114. The prior classifier 110 can provide a vehicle class 112 to the annotator 114. The annotator 114 can join the vehicle frame data 108 and the vehicle class 112 to generate labeled data 116 that is provided to the NN trainer 118.

The laser sensor 102 can generate light. The laser sensor 102 can be positioned such that light it generates is directed at and reflects off a surface in the vicinity of a vehicle tolling gantry. A gantry is a bridge-like overhead structure with a platform supporting equipment. In the context of vehicle tolling, the equipment can be a camera, a laser sensor, or the like. The gantry can be sized to allow vehicles to pass therethrough.

The laser sensor 102 includes a transducer (e.g., sensor) that receives light reflected off the surface. A timer of the laser sensor 102 records a time at which the light was produced, a time at which the reflected light was detected at the transducer, a difference between the time the light was produced and the reflected light was detected, or a combination thereof. Laser light includes light waves of a same wavelength and a fixed phase ratio (coherence) resulting in an almost parallel light beam.

The scan data 104 can include the time at which the light was produced, a time at which the reflected light was detected at the transducer, a difference between the time the light was produced and the reflected light was detected, a distance determined by the laser sensor 102, or a combination thereof. The vehicle detection and framing operator 106 can determine a distance to the surface object) based on the scan data 104 or receive the distance from the laser sensor 102. The distance to the surface can be converted to a height of the surface using simple subtraction (e.g., distance from sensor 102 to road—determined distance to the surface).

The vehicle detection and framing operator 106 can determine when a vehicle is present based on the scan data 104. If the scan data 104 includes data indicative of a height within a specified range of expected heights and a width within a specified range of widths for a specified number of frames (e.g., greater than one), the vehicle detection and framing operator 106 can determine that a vehicle is present. Responsive to determining that the vehicle is present, the vehicle detection and framing operator 106 can generate frame data 108 for the vehicle. The frame data 108 is a synthetic image that includes pixels with values indicative of the height of the vehicle at the geolocation corresponding to the pixel.

The prior classifier 110 is any prior vehicle classifier capable of classifying vehicles in classes sufficient for tolling purposes. The prior classifier 110 can generate a vehicle class 112 corresponding to the vehicle. The prior classifier 110 can be vetted to be sufficiently accurate (at least under certain specified environmental conditions).

The annotator 114 can correlate and join the vehicle frame data 108 and the vehicle class 112, such that the vehicle class 112 is accurately associated with the vehicle frame data 108. Such correlation can be performed by including synchronized time and location data in the scan data 104, the vehicle frame data 108, and the vehicle class 112. Time is relative to a consistent starting time. Location is relative to a lane or lanes in a toll station. Using a consistent time and location allows correlation of the vehicle class 112 (see table 1 for examples of vehicle classes) and the vehicle frame data 108, such that vehicle frame data 108 corresponding to a same time and location as the vehicle class 112 can be associated with each other. The result of the annotator 114 is labeled data (a pair of data (vehicle frame data, vehicle class).

The labeled data 116 can be used, by the trainer 118, to train an NN. More details regarding training are provided elsewhere herein. The trainer 118 can adjust weights of neurons of the NN 120 until the NN 120 is able to classify the vehicle frame data 108 at a desired accuracy rate.

The NN 120 can include a CNN. The NN 120 can include a cluster-encoding autoencoder in place of a later that is conventionally a softmax layer. More details regarding this particular type of cluster-encoding autoencoders are provided elsewhere. The NN 120 in some embodiments can include a 7 layer CNN with 4 convolutional layers and 3 dense layers, followed by a classification layer or autoencoder.

Figure 2:
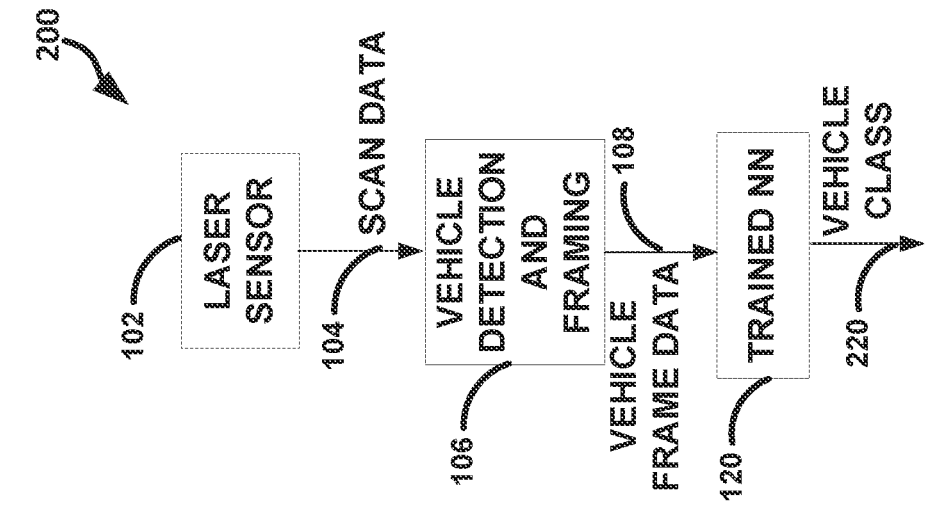
FIG. 2 illustrates, by way of example, a block diagram of an embodiment of vehicle classification system in use.

FIG. 2 illustrates, by way of example, a block diagram of an embodiment of vehicle classification system 200 in use. The laser sensor 102 provides further scan data 104 to the vehicle detection and framing operator 106. The vehicle detection and framing operator 106 provides the vehicle frame data 108 to the trained NN 120. The NN 120 determines a vehicle classification 220 (see table 1 for example classifications) for the scan data 104. The vehicle classification 220 can then be used for tolling purposes, such as generating or recording a charge or bill for the owner or agent of the vehicle.

Figure 3:
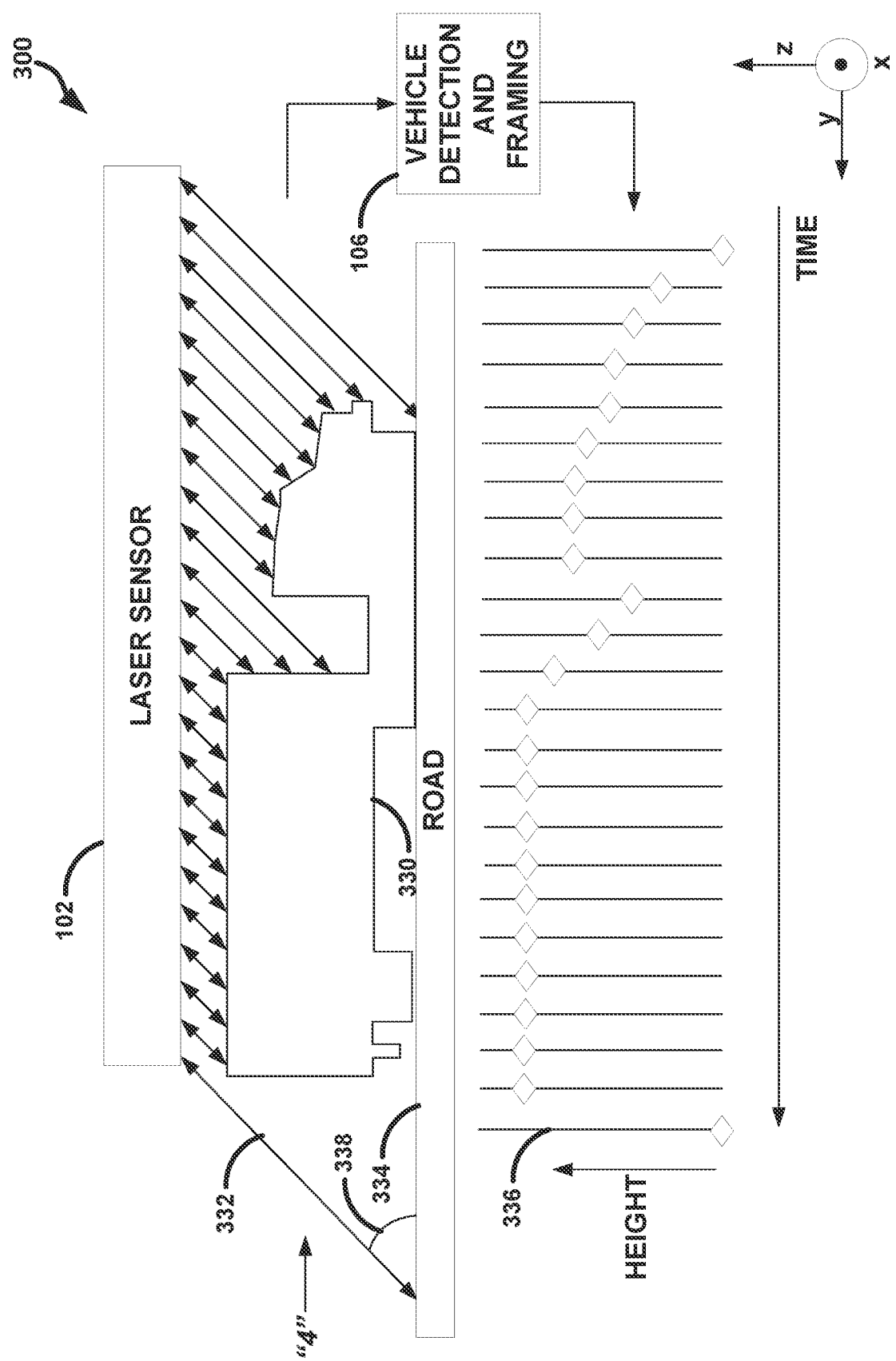
FIG. 3 illustrates, by way of example, a conceptual block diagram of an embodiment of converting a time series of the laser scan data to height data.

FIG. 3 illustrates, by way of example, a conceptual block diagram of an embodiment of converting a time series of the laser scan data 104 to height data. The laser sensor 102 produces a series of light pulses 332 that correspond to reflections received at the laser sensor 102 (indicated by the light pulses 332 being double arrows). The laser sensor 102 provides scan data 104 to the vehicle detection and framing operator 106 as discussed regarding FIGS. 1-2. The vehicle detection and framing operator 106 incudes data indicating a distance to the roadway 334 The difference in the distance to the roadway 334 for a laser pulse and the distance to a surface of a vehicle 330 can indicate a height of the vehicle 330 (or an object on the vehicle 330).

The laser sensor 102 can include a fan laser that fans out multiple laser pulses over space (in the x-direction). Each of the fanned out laser pulses can correspond to a column of pixel data in an image to be classified by the trained NN 120. The columns of the pixels can thus hold a time series of values for a given section of the road 334. The rows of the pixel values can correspond to respective time slices across a section of the road 334. The number of entries in the columns can vary in proportion to the width of the vehicle 330 being classified. The number of entries in the rows can vary in proportion to the length and speed of the vehicle 330 being classified.

The laser pulse 332 from the laser sensor 102 can be presented at a specified angle to the road 334 (indicated by angle 338). The angle 338 can be about 20 degrees, 25 degrees, 30 degrees, 35 degrees, 40 degrees, 45 degrees, 50 degrees, 55 degrees, 60 degrees, 65 degrees, 70 degrees, a greater or lesser angle, or an angle therebetween.

The laser sensor 102 can wait a specified time between generated light pulses so as to generate a time series of laser pulses and reflected laser pulses. In FIG. 3, the laser pulse 332 farthest in front of the vehicle 330 was generated at a first time, and each laser pulse 332 thereafter was generated consecutively until the laser pulse 332 farthest behind the vehicle 330. By having multiple laser pulses spaced perpendicular with the road and time between generated pulses, an image of height values can be generated.

Figure 4:
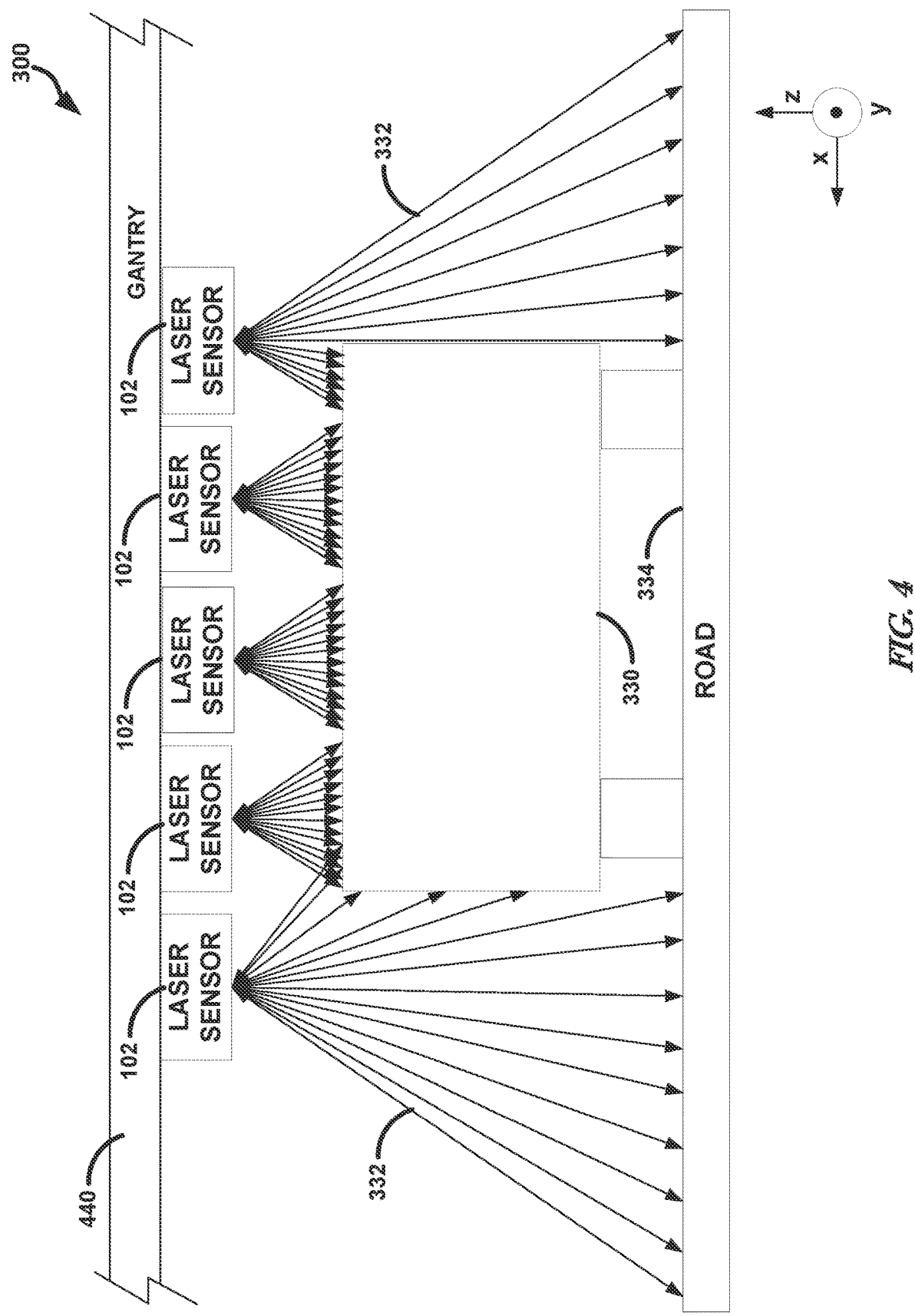
FIG. 4 illustrates, by way of example, a diagram of the system of FIG. 3 from a perspective indicated by arrow labelled "4" in FIG. 3.

FIG. 4 illustrates, by way of example, a diagram of the system 300 from a perspective indicated by arrow labelled "4" in FIG. 3. The laser sensor 102 is mounted to a gantry 440.

In some instances, depending on the orientation of the laser of the laser scanner and the height or presence or absence of the vehicle 330, directly adjacent laser pulses can scan a region corresponding to a same pixel. In such instances, the vehicle detection and framing operator 106 can determine which height corresponds to the pixel. This can be accomplished by keeping the height closest to a height of a neighboring pixel, keeping the height closest to an average height of a neighborhood of pixels (e.g., a 3×3 square of pixels surrounding the pixel), a greater or lesser height value, or the like.

In some instances, the laser sensor 102 does not receive a return reflection. In such instances, the height of that pixel can be set to a minimum value (e.g., 0), a height of a neighboring pixel, an average height of a neighborhood of pixels, or the like. In such instances, the vehicle detection and framing operator 106 can generate a bitmap along with the image of the height values. The bit map can be part of the vehicle frame data 108. The bit map can indicate which values are interpolated and which are real. The NN can learn based on the bit map and the image of the frame data 108.

Figure 5:
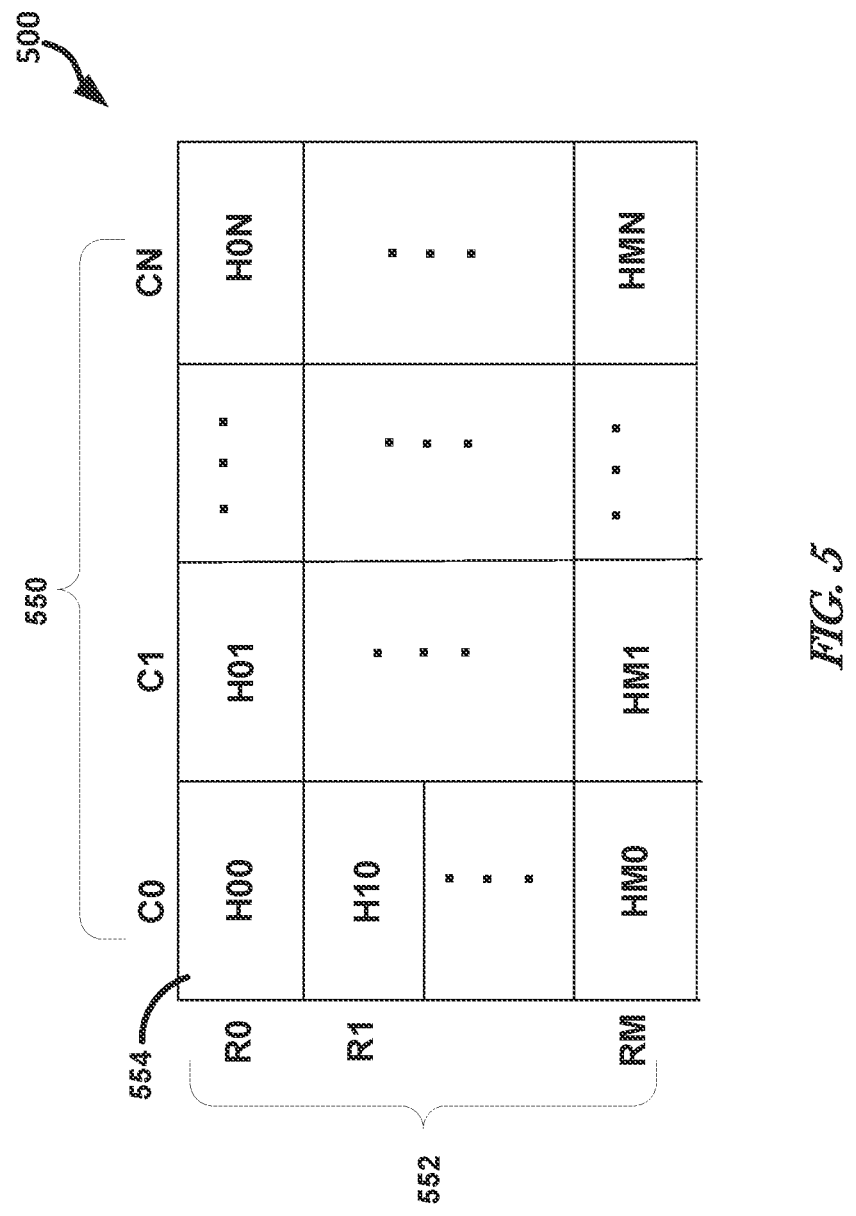

FIG. 5 illustrates, by way of example, a diagram of an embodiment of an image 500, such as can be part of the vehicle frame data 108. The image 500 includes entries 554 that each correspond to a respective row 552 and column 550 of the image 500. The entries 554 indicate the height of the vehicle 330 at a location on the road 334 and a time. In the embodiment of FIG. 5, entries 554 in the column 550 corresponding to higher rows correspond to later times, but this can be reversed. In the embodiment of FIG. 5, entries 554 across a respective row 552 correspond to different locations across the road 334.

Figure 6:
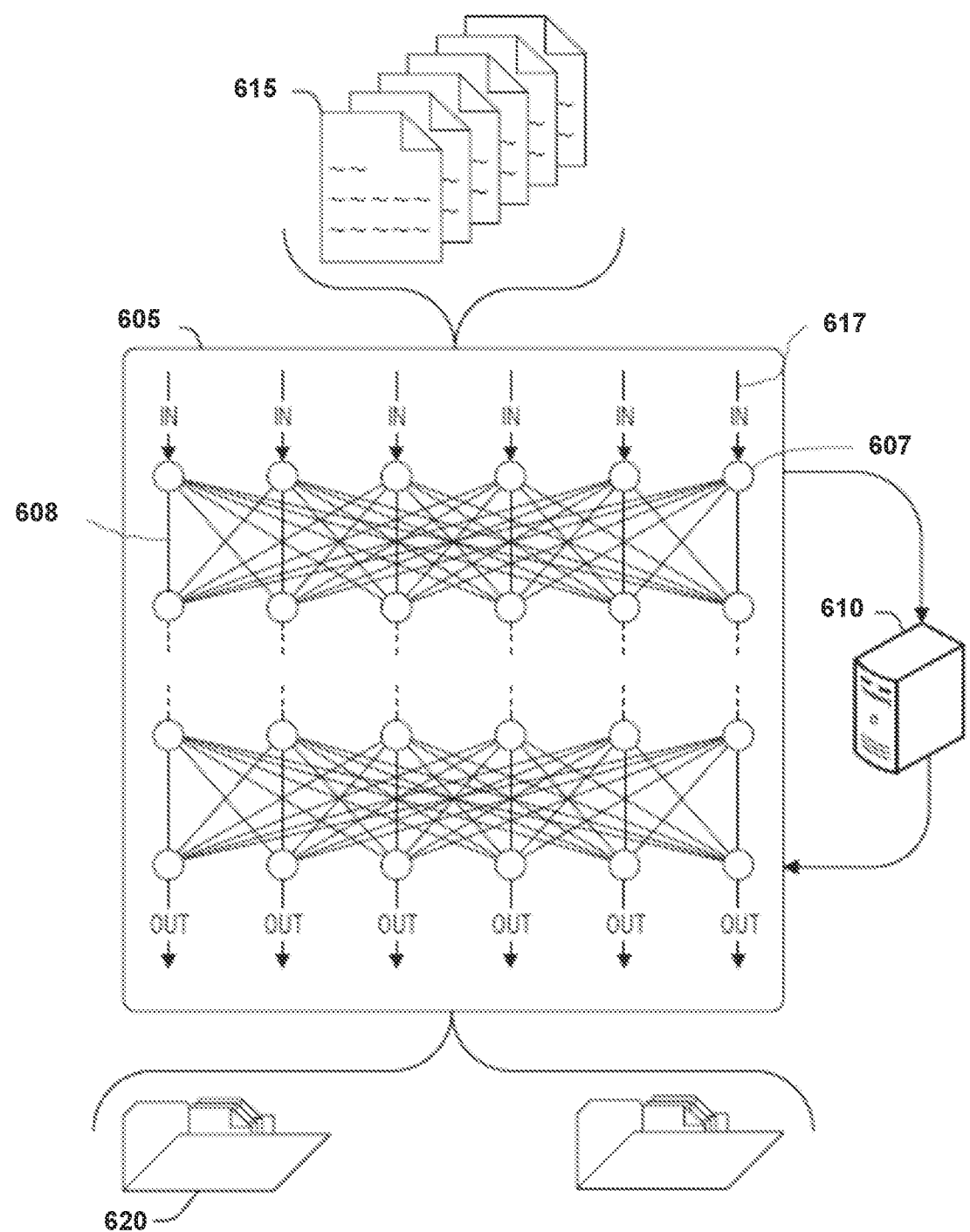
FIG. 6 is a block diagram of an example of an environment including a system for neural network training, according to an embodiment.

FIG. 6 illustrates, by way of example, a block diagram of an embodiment of an environment including a system for neural network training. AI is a field concerned with developing decision-making systems to perform cognitive tasks that have traditionally required a living actor, such as a person. Artificial Neural Networks (ANNs) are computational structures that are loosely modeled on biological neurons. Generally, ANNs encode information (e.g., data or decision making) via weighted connections (e.g., synapses) between nodes (e.g., neurons). ANNs are foundational to many AI applications, such as speech recognition.

Many ANNs are represented as matrices of weights that correspond to the modeled connections. ANNs operate by accepting data into a set of input neurons that often have many outgoing connections to other neurons. At each traversal between neurons, the corresponding weight modifies the input and is tested against a threshold at the destination neuron. If the weighted value exceeds the threshold, the value is again weighted, or transformed through a nonlinear function, and transmitted to another neuron further down the ANN graph—if the threshold is not exceeded then, generally, the value is not transmitted to a down-graph neuron and the synaptic connection remains inactive. The process of weighting and testing continues until an output neuron is reached; the pattern and values of the output neurons constituting the result of the ANN processing.

The correct operation of most ANNs relies on accurate weights. However, ANN designers do not generally know which weights will work for a given application. ANN designers typically choose a number of neuron layers or specific connections between layers including circular connections. A training process may be used to determine appropriate weights by selecting initial weights. In some examples, the initial weights may be randomly selected. Training data is fed into the ANN and results are compared to an objective function that provides an indication of error. The error indication is a measure of how wrong the ANN's result is compared to an expected result. This error is then used to correct the weights. Over many iterations, the weights will collectively converge to encode the operational data into the ANN. This process may be called an optimization of the objective function (e.g., a cost or loss function), whereby the cost or loss is minimized.

A gradient descent technique is often used to perform the objective function optimization. A gradient (e.g., partial derivative) is computed with respect to layer parameters (e.g., aspects of the weight) to provide a direction, and possibly a degree, of correction, but does not result in a single correction to set the weight to a "correct" value. That is, via several iterations, the weight will move towards the "correct," or operationally useful, value. In some implementations, the amount, or step size, of movement is fixed (e.g., the same from iteration to iteration). Small step sizes tend to take a long time to converge, whereas large step sizes may oscillate around the correct value or exhibit other undesirable behavior. Variable step sizes may be attempted to provide faster convergence without the downsides of large step sizes.

Backpropagation is a technique whereby training data is fed forward through the ANN—here "forward" means that the data starts at the input neurons and follows the directed graph of neuron connections until the output neurons are reached—and the objective function is applied backwards through the ANN to correct the synapse weights. At each step in the backpropagation process, the result of the previous step is used to correct a weight. Thus, the result of the output neuron correction is applied to a neuron that connects to the output neuron, and so forth until the input neurons are reached. Backpropagation has become a popular technique to train a variety of ANNs. Any well-known optimization algorithm for back propagation may be used, such as stochastic gradient descent (SGD), Adam, etc.

FIG. 6 is a block diagram of an example of an environment including a system for neural network training, according to an embodiment. The system can aid in training of a cyber security solution according to one or more embodiments. The system includes an ANN 605 that is trained using a processing node 610. The processing node 610 may be a central processing unit (CPU), graphics processing unit (GPU), field programmable gate array (FPGA), digital signal processor (DSP), application specific integrated circuit (ASIC), or other processing circuitry. In an example, multiple processing nodes may be employed to train different layers of the ANN 605, or even different nodes 607 within layers. Thus, a set of processing nodes 610 is arranged to perform the training of the ANN 605.

The set of processing nodes 610 is arranged to receive a training set 615 for the ANN 605. The ANN 605 comprises a set of nodes 607 arranged in layers (illustrated as rows of nodes 607) and a set of inter-node weights 608 (e.g., parameters) between nodes in the set of nodes. In an example, the training set 615 is a subset of a complete training set. Here, the subset may enable processing nodes with limited storage resources to participate in training the ANN 605.

The training data may include multiple numerical values representative of a domain, such as a word, symbol, other part of speech, or the like. Each value of the training or input 617 to be classified once ANN 605 is trained, is provided to a corresponding node 607 in the first layer or input layer of ANN 605. The values propagate through the layers and are changed by the objective function.

As noted above, the set of processing nodes is arranged to train the neural network to create a trained neural network. Once trained, data input into the ANN will produce valid classifications 620 (e.g., the input data 617 will be assigned into categories), for example. The training performed by the set of processing nodes 607 is iterative. In an example, each iteration of the training the neural network is performed independently between layers of the ANN 605. Thus, two distinct layers may be processed in parallel by different members of the set of processing nodes. In an example, different layers of the ANN 605 are trained on different hardware. The members of different members of the set of processing nodes may be located in different packages, housings, computers, cloud-based resources, etc. In an example, each iteration of the training is performed independently between nodes in the set of nodes. This example is an additional parallelization whereby individual nodes 607 (e.g., neurons) are trained independently. In an example, the nodes are trained on different hardware.

Using a prior classifier 110 for annotation introduces the errors and bias from that system into the trained NN 120. To help mitigate this, the labels from the prior classifier 110 can be converted to informed pseudolabels (IPLs). IPLs determine a most likely class with consideration of an estimate of noise per class. An IPL technique can identify and correct missing or erroneous labels that came from error propagation.

Figure 7:
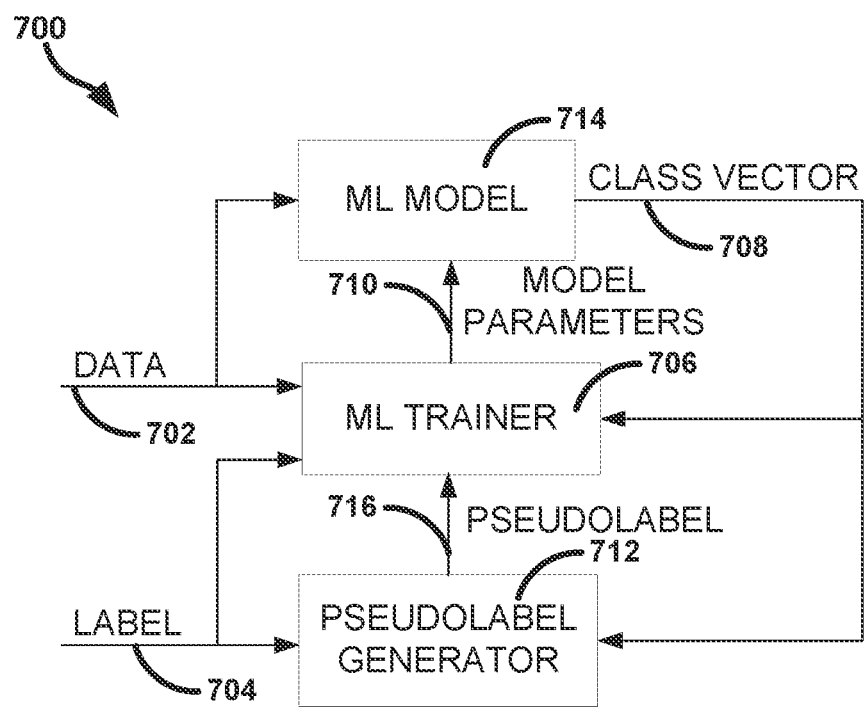
FIG. 7 illustrates, by way of example, a diagram of an embodiment of a system for ML using informed pseudolabels.

FIG. 7 illustrates, by way of example, a diagram of an embodiment of a system 700 for ML using informed pseudolabels. The system 700 as illustrated includes an ML trainer 706 (similar to trainer 118), an ML model 714, and a pseudolabel generator 712. The ML model 714, often times a neural network (NN), receives a data vector 702 and produces a class vector 708 that contains confidence values for a specified set of classes that may be assigned to the data vector 702. The ML trainer 706 receives the class vector 708, the data 702, a label 704 in a first number of epochs of ML training and a pseudolabel 716 in a subsequent epoch after the first number of epochs and produces updated model parameters 710. The ML trainer 706 can operate in a semi-supervised or supervised manner, sometimes called deep learning.

Supervised deep learning can include large annotated datasets, but large datasets often contain labels 704 (sometimes called annotations) that are incorrect. The label 704 indicates a class to which the data 702 is a member. Often times the label 704 is manually generated (e.g., by a human), such as by crowd sourcing. Not all labels 704 are accurate, as the human-generated label 704 can be inaccurate. Incorrect labels used to train an NN, or other ML technique, can diminish the resulting classification accuracy of the NN. Currently, datasets exist with large numbers of incorrect, sometimes called noisy, labels 704. At least some of these datasets cannot be effectively used due to these errors in labeling.

The system 700 uses an informed pseudolabel generator 712 to generate a pseudolabel 716 that is used as a class assignment by the ML trainer 706. The informed pseudolabel generator 712 receives a class vector 708 from the ML model 714 and may also receive a label 704. The pseudolabel generator 712 can, based on the label 704 and the class vector 708, determine a pseudolabel 716 to be associated with the data 702 in a next training epoch.

Pseudolabels, traditionally, were training labels that were chosen based on the output of a partially trained ML model 714. In comparison, the pseudolabel 716 of embodiments can be determined, by the pseudolabel generator 712, using a statistical model of the label noise (see FIG. 8). In embodiments, a pseudolabel 716 can be selected that maximizes an a posteriori probability (e.g., the MAP estimate) of the correct class assignment given the data 702, the existing label 704 and the class vector 708. For some priors over the class labels, this is equivalent to maximizing a likelihood (e.g., a log likelihood) of the data 702 and the existing labels 704 and the class vector 708.

The pseudolabel generator 712 can determine the pseudolabels 716 of noisy-labeled data using Bayesian, or other statistics. Embodiments can be easy to implement, with virtually no additional computational cost. Embodiments can avoid changing the architecture of the ML model 714 or cost objective (can use existing network architectures).

Pseudolabels have been shown to be a useful semi-supervised learning approach but have only been applied previously to unlabeled data. Embodiments can apply pseudolabels 716 to data that has unreliable or noisy labels with an estimated probability of error (noise model). This can be called an "informed pseudolabel method." The informed pseudolabel method has a theoretical basis, outlined below, and this framework can be applied to tailor embodiments for a wide variety of noise models, whether the noise model is symmetric or asymmetric. Embodiments are simple and efficient to implement in terms of computation bandwidth and memory requirements, and unlike other methods for handling noisy labels, do not require changes to the machine classifier network architecture. Even with its simplicity, results demonstrate that embodiments are competitive with or exceed state-of-the-art performance for noisy labeled data on the Modified National Institute of Standards and Technology (MNIST) dataset.

Advantages or advancements provided by embodiments can include one or more of: (a) Pseudolabels can be used in place of assigned but noisy labels—previously pseudolabels were only used for unlabeled data; (b) a statistical framework with a noise model can provide a principled approach for choosing between a given label and a label predicted by the system 700 (the pseudolabel 716); (c) pseudolabels can be assigned to maximize log likelihood of the data 702 and the label 704; (d) use of pseudolabels 716 for data 702 with noisy or unreliable labels can be used as regression targets (for training the ML technique; (e) application of a statistical model of the labeling errors (noise model) to assign pseudolabels 716; and (f) selection of pseudolabels 716 by maximizing an a posteriori probability of the correct label given the data and previously assigned labels.

Pseudolabels 716 are a semi-supervised approach traditionally applied to unlabeled data. Embodiments, however, make use of noisy labels with a known or estimated probability of correctness to inform pseudolabel 716 selection. While extremely noisy labels have limited use with most supervised methods, embodiments demonstrate that a high percentage of label errors may be tolerated using a semi-supervised approach that takes the reliability of the labels into account. In embodiments, pseudolabel 716 selection can be biased towards the correct labels according to a given noise model. Experimental results for these methods are given below. On the MNIST dataset, training with informed pseudolabels achieves over 98% accuracy even if 70% of labels are chosen completely at random, and over 95% accuracy if 90% of the labels are chosen at random. On CIFAR-10, training with informed pseudolabels provides a 24% reduction in the error rate over training with only the noisy labels when half the labels are noise.

The ML trainer 706 can, based on the pseudolabel 716, generate more accurate model parameters 710 than an ML trainer 706 that operates based on only the labels 704. The ML trainer 706 can be more accurate because the pseudolabels 716 can account for noise in the label 704 that can cause the label 704 to be inaccurate.

The class vector 708 can include a confidence for each class to be classified by the ML model 714. The class vector 708 can indicate, for each class, an odds of the probability of the class divided by the probability of not the class. The class vector 708 can be log-odds of the probability of the class divided by the probability of not the class. This is sometimes called logits. The logits are the inverse of the sigmoidal function or logistic transform.

The model parameters 710 are weights associated with respective structures of the model. A model parameter 710 is a configuration variable that is internal to the model. The model parameter 710 is estimated from data. The model parameter 710 is used by the ML model 714 in making a prediction.

In some embodiments, the ML model 714 can include a segmentation model. The segmentation model can classify one or more image pixels. The provided labels can include an annotation type (bounding boxes, ellipses, point targets, polygons) for target objects represented in input images. The pseudolabel generator 712 can implement a noise model that estimates the probability of mislabeled pixels where the pixel labels are derived from the provided labels.

Figure 8:
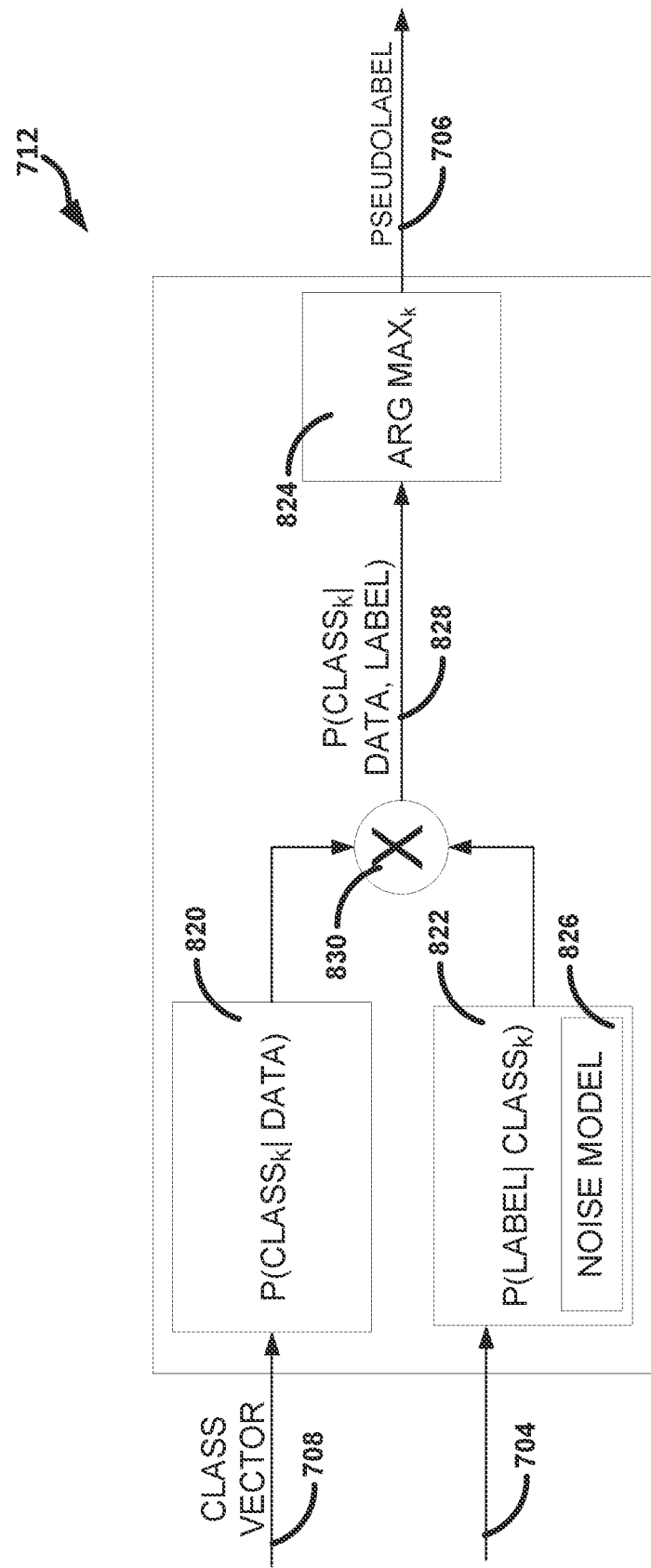
FIG. 8 illustrates, by way of example, an exploded-view diagram of an embodiment of the pseudolabel generator.

FIG. 8 illustrates, by way of example, a diagram of an embodiment of the pseudolabel generator 712. The pseudolabel generator 712 can receive the logits 708 and the label 704, $(x_n, \hat{y}_n)$, where $x_n$ denotes the input data, and $\hat{y}_n$ denotes potentially incorrect class labels (the label 704)$\in 1, \ldots, K$. The pseudolabel generator 712 can determine a pseudolabel 716, $y'_n$, as a surrogate for a true label $y^*_n$ to train an ML model (e.g., a machine classifier). The ML model can include a deep neural network (DNN), such as a convolutional neural network (CNN), recurrent neural network (RNN), or the like, or other ML technique. The discussion that follows assumes the ML technique includes an NN in which the output layer activations, $f_n^k(x_n)$ are logits (log of the odds p/(1−p), where p is probability), and considered to estimate the conditional log probability of each class $k \in 1, \ldots, K$:

$$f_n^k(x_n) \approx \log P(y^*_n = k | x_n) \quad (1)$$

Assume the noise process that generates label errors is dependent only on the correct class label, and independent of the data 702, such that:

$$P(x_n, \hat{y}_n | y^*_n) = P(x_n | y^*_n) P(\hat{y}_n | y^*_n) \quad (2)$$

In other words, assume that network predictions and the noisy class labels provide independent evidence of the true class labels. Note that this conditional independence assumption is violated, for example, if labeling errors are more common for noisy data instances which may also be more poorly predicted by the network.

In a traditional implementation, pseudolabels are assigned the predicted value of a partially trained network (e.g., $y'_n = \text{argmax}_k f_n^k$). However, such an approach does not consider any, albeit partial, information provided by the noisy labels $\hat{y}_n$. Instead, the pseudolabel generator 712 can select the pseudolabel 716 that maximizes the probability of the true class assignment given the data 702 and the estimated label 704 using a statistical method known as maximum a posteriori (MAP) estimation. In embodiments, the pseudolabel generator 712 can maximize the log a posteriori probability to determine the pseudolabel 716, which also maximizes the a posteriori probability. For uniform priors over the true class, this is also equivalent to maximizing the likelihood or log likelihood of the observed label 704 and data 702. In mathematical terms, the pseudolabel 716 can be represented as:

$$y'_n = \underset{k}{\text{argmax}}[\log P(y^*_n = k | x_n, \hat{y}_n)] \quad (3)$$

Applying Bayes' theorem and the conditional independence assumption expressed in equation (2), $$P(y^*_n | x_n, \hat{y}_n) = \frac{P(x_n, \hat{y}_n | y^*_n) P(y^*_n)}{P(x_n, \hat{y}_n)} \quad (4)$$

$$= \frac{P(x_n | y^*_n) P(\hat{y}_n | y^*_n) P(y^*_n)}{P(x_n, \hat{y}_n)} \quad (5)$$

$$= \frac{P(y^*_n | x_n) P(x_n) P(\hat{y}_n | y^*_n)}{P(x_n, \hat{y}_n)} \quad (6)$$

$$\propto P(y^*_n | x_n) P(\hat{y}_n | y^*_n). \quad (7)$$

A matrix $\Lambda$ can be defined as $$\Lambda_{i,j} \overset{\text{def}}{=} \log P(\hat{y}_n = i | y^*_n = j) \quad (8)$$

With the network approximation (1), equation (3) can be expressed as:

$$y'_n = \underset{k}{\text{argmax}}[f_n^k(x_n) + \Lambda_{\hat{y}_n, k}]. \quad (9)$$

If labels are stored as an N×K one-hot matrix $\hat{Y}$ for N data instances, and the network output is an N×K matrix F, the inner expression in Equation (9) can be performed with a single matrix multiplication and addition: $F + \hat{Y}\Lambda$. A one-hot matrix includes values that can be represented in binary with a single one, and the remaining values zero. For example: 0001 or "1", 0010 or "2", 0100 or "4", and 1000 or "8" are the one-hot numbers for a four-bit binary number set.

It is a general practice to train neural networks on a balanced dataset, where each class is equally represented. A potential challenge arises if marginal distributions are unequal, (e.g., $P(\hat{y}) \neq P(y^*)$).

In this case, while the assigned labels 704 may have been initially balanced for training, the resulting pseudolabels 716 are likely no longer balanced between classes. If this situation is not handled properly, the trained ML model may become biased towards generating a class with a higher frequency of pseudolabels 716. Approaches to correct this problem include oversampling the dataset according to $P(y^*)/P(\hat{y})$, adjusting the loss function, or weighting the contribution of each instance to the network update to account for the class imbalance.

While the noise model explored in the following section is symmetric and does not have this imbalance, another symmetric or asymmetric noise model can be used in its place. A uniform class noise can be applied to a varying percentage of training labels, where ρ is the probability of changing the label. Given this noise model, $$P(\hat{y}_n = i \mid y_n^* = j) = \begin{cases} (1-\rho) + \rho/K & \text{if } i = j \\ \rho/K & \text{if } i \neq j \end{cases} \text{ and} \quad (10)$$

$$\Lambda_{\hat{y}_n,k} = \delta_{\hat{y}_n,k} \log \left[ K(1-\rho)/\rho + 1 \right] - \log \rho/K, \quad (11)$$

where $\delta_{i,j}$ is the Kronecker delta function. Since log $\rho/K$ is constant over k, pseudolabels can be assigned according to $$y'_n = \underset{k}{\operatorname{argmax}} \left[ f_n^k(x_n) + \lambda \delta_{\hat{y}_n,k} \right], \quad (12)$$

where parameter $\lambda$ is theoretically optimal at a value of $$\lambda^* = \log[K(1-\rho)/\rho + 1]. \quad (13)$$

FIG. 8 illustrates, by way of example, an exploded-view diagram of an embodiment of the pseudolabel generator 712. The pseudolabel generator 712 receives the label 704 and the class vector 708 determined by the ML model. The pseudolabel generator 712 can determine, based on the class vector 708, a probability 820 of each class label, given the data 702. The probability 820 of the true class label given the data 702 can be determined based on the input/output examples used to train the ML model 714 in a previous epoch and the information in the class vector 708 generated by the ML model 714. In some embodiments, the output activations of an NN model can be trained to estimate the probability 820 using the input/output examples. In other embodiments, the output activations of a NN model can be trained to estimate a log probability for each class.

The pseudolabel generator 712 can determine, based on the label 704, a probability 822 that the label 704 was presented given the true label is of a particular class, for each class to be identified by the ML model. The probability 822 of the label given the true label can be determined based on a model of the label noise. In some embodiments, this noise model may be based on prior knowledge about the cause labeling errors. In some embodiments, the noise model can be determined empirically from a subset of the data. In some embodiments, the noise model may be based on manual verification of a subset of the labels. In some embodiments, the noise model may be based on the cumulative output of the ML model 714. The true labels can be determined for at least some of the data 702. For each data, the associated label 704 can be recorded along with the true label. The percentage of classifications having an associated label 704 relative to all the entries with the true label can indicate the probability 822.

In some embodiments, the probability 822 can be determined based on a symmetric or asymmetric noise model 826. The noise model 826 can be determined empirically, as discussed previously regarding determining the probability 822. In some embodiments, the noise model 826 can be assumed symmetric. In such an embodiment, it is assumed that the determined class vector 708 can be mistaken for any other class with equal probability.

The pseudolabel generator 712 can determine the pseudolabel 716 by determining the class label associated with the maximum 824 of a mathematical combination 830 of the probabilities 820, 822. For example, the combination 830 can include one or more mathematical operations on the probabilities 820, 822, such as addition, subtraction, multiplication, division, log, exponent, min, max, floor, ceiling, modulus, or the like. The combination 830 of the probabilities 820, 822 can indicate a probability 828 of the class label ("class$_k$" in the terms of FIG. 8) given the data and label. In some embodiments, probabilities 820, 826 can be multiplied to determine a probability 828 for each class. In some embodiments the probabilities 820, 826 can be replaced with log probabilities which can be summed to determine a log probability having the same maximal class.

Consider a system that determines which class to associate with data and assume that the probability 820 of the class given the data is [0.22, 0.76, 0.08] and probability 822 of the label 704 given the class is [0.89, 0.11, 0]. The maximum of probability 820 times probability 822 is max[0.20, 0.08, 0]=0.20. Since 0.20 is associated with the first entry, the pseudolabel generator 712 can determine the pseudolabel 716 is the class associated with the first entry.

Figure 9:
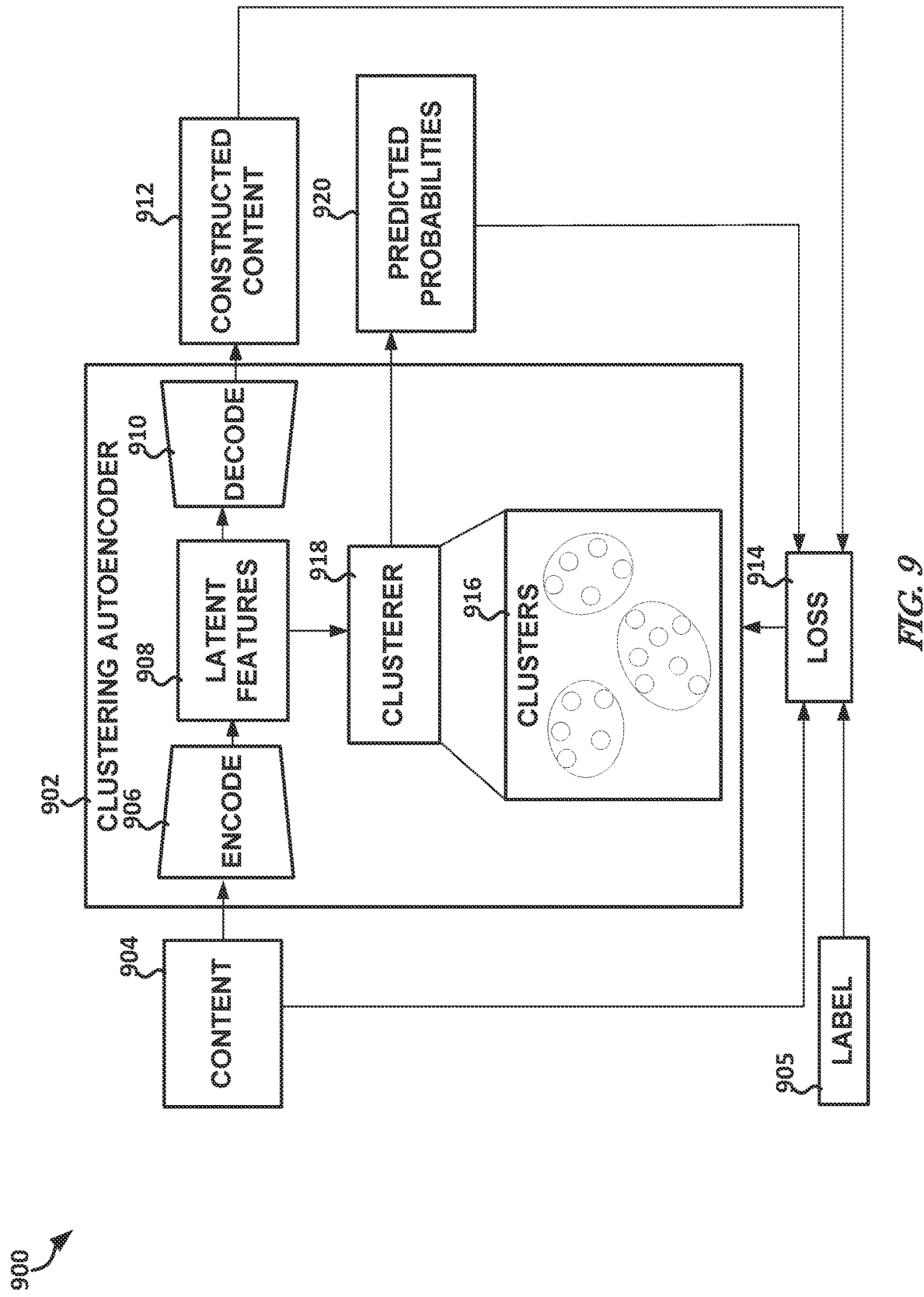
FIG. 9 illustrates, by way of example, a diagram of an embodiment of a clustering autoencoder system.

FIG. 9 illustrates, by way of example, a diagram of an embodiment of a clustering autoencoder system 900. The system 900, as illustrated, includes a clustering autoencoder 902, content 904, a label 905 indicating a classification of the content 904, and reconstructed content 912.

The content 904 can include an image (e.g., a color, black and white, infrared, nighttime, a video frame, or the like), a point set (e.g., a 2D or 3D point set) with or without intensity data, a document (e.g., a portable data format (pdf), text, word, or the like), network traffic data (e.g., control plane or data plane packets or the like), or other data. The label 905 indicates a classification of the content 904

An autoencoder, such as the autoencoder 902, learns to copy its input to its output. An autoencoder has an internal layer (a hidden layer) that describes a "code" (sometimes called a "latent feature vector" or "latent feature representation" herein) used to represent the input. The autoencoder 902 includes an encoder 906 that maps the content 904 into the latent feature vector 908. The autoencoder 902 includes a decoder 910 that maps the latent feature vector 908 to a reconstruction of the content 904. The reconstruction of the content 904 is illustrated as reconstructed content 912 in FIG. 9.

The latent feature vector 908 can be provided to a clustering classification layer, illustrated as the clusterer 918 in FIG. 9. The clusterer 918 can determine a cluster (if any) of the clusters 916 to which the content 904 belongs. The clusterer 918 determines a distance between the latent feature vector 908 of the content 904 and latent features vectors of one or more points (e.g., a central value, such as a latent feature vector of a centroid) of the clusters 916. The distance can be converted to a predicted probability 920 that indicates how likely it is that the content 904 belongs to the cluster. The clusterer 918 in some embodiments can include a fully connected NN layer.

The number of output dimensions of the encoder 906 can be specified as a hyper-parameter design choice. The autoencoder 906 designer can decide how many latent features are included in the latent feature vector 908 by the encoder 906.

The decoder 910 can construct content 912 based on the latent feature vector 908. A difference between the content 904 input into the encoder 906 and the reconstructed content 912 produced by the decoder 910 can be determined based on a cost function known as the loss 914. Additionally, a difference between the label 905 and the predicted probability 920 from the clusterer can be determined based on the loss 914. The cost determined by the loss 914 can be fed back to the clustering autoencoder 902. The loss 914 can be backpropagated through the clustering autoencoder 902, such as for training the clustering autoencoder 902. During runtime, the decoder 910 and the loss 914 are not used.

More formally, the clustering autoencoder 902 includes an encoder 906 network, E, that transforms each input data vector, x, (representing the content 904) into a latent vector 908, z. The decoder 910, D, transforms the latent vector 908, z, back into the data space of x. The decoder 910, D, further provides cluster parameters that describe the probability of class membership for each class based on the latent feature vector 908, z.

The clustering autoencoder 902 has model parameters that include network weights for both the encoder 906, E, and decoder 910, D, and parameters that define the clusters 916. Parameter adjustment is determined by reducing a loss function, $\mathcal{L}$. The loss function, $\mathcal{L}$, can include a term that measures the error between the data vector, x, and the reconstructed data 912, $\hat{x}:=D(E(x))$. The loss function, $\mathcal{L}$, can include a term that measures the error between the labels (y), a vector assigning x to a set C of N classes, and the vector of cluster probabilities $\hat{y}$ determined by the clusterer 918, where $\hat{y}_i := P(x \in C_i)$ for $i \in \{1, \ldots, N\}$. Label assignments can be either exclusive or non-exclusive, and may be either 0, 1, or a real value between 0 and 1, sometimes representing a probability.

One embodiment of the loss function 914, $\mathcal{L}$, can include the following loss function with two terms. One term can include an L2 norm between the content 904 and its reconstruction 912 and another term can include the KL-divergence ($D_{KL}$) between the labels y and the predicted probabilities $\hat{y}$:

$$\mathcal{L} = \|x - \hat{x}\|^2 + \lambda D_{KL}(y\|\hat{y})$$

A hyper-parameter $\lambda$ provides the relative weighting factor between the L2 term and the KL-divergence term.

Alternative to the L2 norm the reconstruction loss can include a mean square error (MSE), a root MSE (RMSE), mean absolute error (MAE), R squared (e.g., 1-MSE (model)/MSE (baseline)) or adjusted R squared, mean square percentage error (MSPE), mean absolute percentage error (MAPE), root mean squared logarithmic error (RMSLE), or the like between the content 904 and the reconstructed content 914.

One embodiment approximates class probabilities using a Student's t-Distribution. Embodiments can estimate vector means, a cluster centroid, for each class i as a vector $\mu_i$ of the same dimension as the latent vector z. The class probability, for each class $C_i$, can thus be determined as in Equation 1:

$$\hat{y}_i := P(x \in C_i) \propto \left(1 + \left\|\frac{z - \mu_i}{\sigma_i}\right\|^2\right)^{-1} \quad \text{Equation 1}$$

A scale parameter, $\sigma_i$, is a vector of the same length as $\mu_i$ that scales the distance between z and $\mu_i$ for each class. Variations of this probability are possible. For example, one variation is realized by assuming a single scale value (a value $\sigma$) rather than scaling in each dimension of z. The parameters of this clustering model (here $\mu_i$ and $\sigma_i$), are learned during the training process. The parameters can be learned to reduce the loss function, $\mathcal{L}$. This encourages the encoder 906, E, to learn a transforming function of x which separates the labeled clusters in the training data. A mixture of Gaussian distributions (MOG) may be used in place of the Student's t-Distribution, such as for clustering.

In practice, a cross-entropy loss term can be used in place of $D_{KL}(y\|\hat{y})$. The minimization of the KL-divergence and minimization of the cross-entropy are equivalent as long as the entropy of the assigned class labels is not affected by the minimization. Other loss terms that enforce similarity between the assigned class labels and the modeled class probabilities may be used. Equivalence between KL-Divergence $D_{KL}(y\|\hat{y})$ and Cross-Entropy $H(y, \hat{y})$ is given by the relationship between them:

$$H(\hat{y}, y) = D_{KL}(y\|\hat{y}) + H(y) = -\Sigma_i y_i \log(\hat{y}_i)$$

Since the entropy of the true labels $H(y) = -\Sigma_i y_i \log(y_i)$ is a constant, minimizing one necessarily minimizes the other.

For cluster models that permit sampling, a sample may be drawn from a cluster and visualized by transforming the sample by the decoder 910, D. Direct sampling from the Student's t-Distribution is not straight forward. After training with the Student's t-Distribution, a MOG distribution can be fit to the clusters 916 for the training data. The samples can then be sampled from the MOG instead of the Student's t-Distribution. Note that this can be done after training the model.

The clustering autoencoder of embodiments provides a lower confidence in its classification when it is incorrect. This is because of the manner in which the probability and confidence are determined by the clustering autoencoder 902, more specifically the clusterer 918.

The neuron configuration of the encoder 906 and decoder 910 is variable and dependent on the application. In some embodiments, the encoder 906 and decoder 910 can have similar structure. The encoder 906 and decoder 910 can include a number of densely connected layers, such as greater than one. The neurons can include a hyperbolic tangent activation function (tan h( )) or other activation function. The number of latent features in the latent feature vector 108 is also variable and can include greater than one latent feature.

Figure 10:
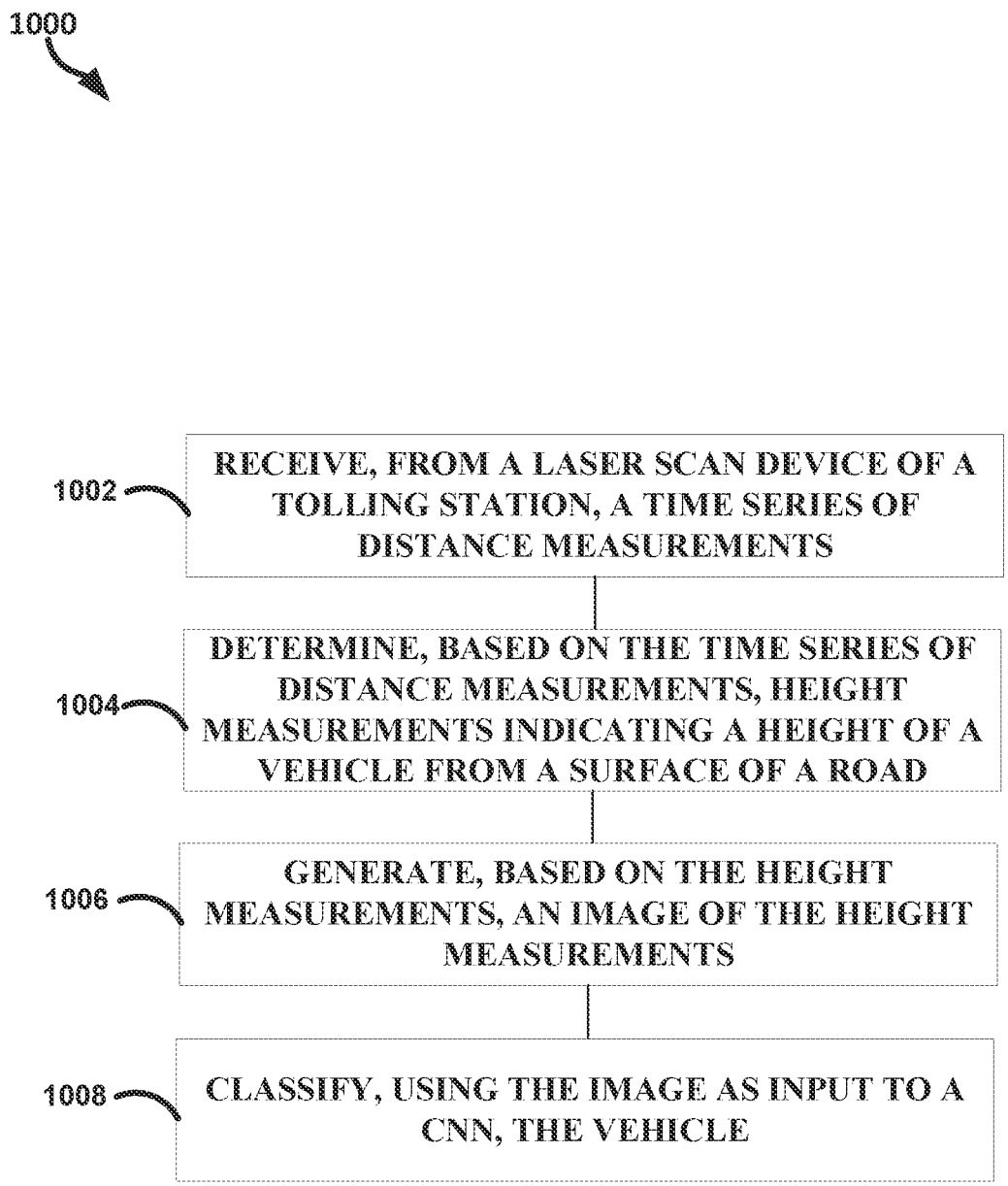
FIG. 10 illustrates, by way of example, a diagram of an embodiment of a method for vehicle tolling operations.

FIG. 10 illustrates, by way of example, a diagram of an embodiment of a method 1000 for. The method 1000 as illustrated includes receiving, from a laser scan device of a tolling station, a time series of distance measurements, at operation 1002; determining, based on the time series of distance measurements, height measurements indicating a height of a vehicle from a surface of a road, at operation 1004; generating, based on the height measurements, an image of the height measurements, at operation 1006; and classifying, using the image as input to a convolutional neural network (CNN), the vehicle, at operation 1008.

The method 1000 can further include generating a toll charge based on the classification. The operation 1004 can further include interpolating a height measurement for a pixel for which there is no height measurement. The method 1000 can further include generating a bit map in which each entry of the bit map indicates whether the entry is interpolated or part of the height measurements. The method 1000 can further include, wherein the image includes rows and columns of pixels, height measurements across the rows indicate different locations across the road at about a same time, height measurements down the columns indicate different times at the same location.

The method 1000 can further include determining the vehicle is present in the road by determining the height measurement is greater than a height measurement of the road. The method 1000 can further include receiving, for a specified location in the road, respective distance measurements from respective laser scanners, including the laser scanner. The method 1000 can further include selecting the distance measurement that is not interpolated and is greater.

The method 1000 can further include, in supervised training of the CNN, using a label generated by a prior classification system. The method 1000 can further include correcting noise in the label using an informed pseudo-label technique resulting in a corrected label and training the CNN using the corrected label. The method 1000 can further include using a clustering autoencoder to detect drift in the CNN, such as drift resulting from weather conditions, changing traffic flows, changes to vehicle designs over time, or a combination thereof. The method 1000 can further include, based on the height measurements, cropping the image to include only a single vehicle and wherein the image is of the single vehicle.

Modules, Components and Logic

Certain embodiments are described herein as including logic or a number of components, modules, or mechanisms. Modules may constitute either software modules (e.g., code embodied (1) on a non-transitory machine-readable medium or (2) in a transmission signal) or hardware-implemented modules. A hardware-implemented module is tangible unit capable of performing certain operations and may be configured or arranged in a certain manner. In example embodiments, one or more computer systems (e.g., a standalone, client or server computer system) or one or more processors may be configured by software (e.g., an application or application portion) as a hardware-implemented module that operates to perform certain operations as described herein.

In various embodiments, a hardware-implemented module may comprise dedicated circuitry or logic that is permanently configured (e.g., as a special-purpose processor, such as a field programmable gate array (FPGA) or an application-specific integrated circuit (ASIC)) to perform certain operations. A hardware-implemented module may also comprise programmable logic or circuitry (e.g., as encompassed within a general-purpose processor or other programmable processor) that is temporarily configured by software to perform certain operations.

Accordingly, the term "hardware-implemented module" should be understood to encompass a tangible entity, be that an entity that is physically constructed, permanently configured (e.g., hardwired) or temporarily or transitorily configured (e.g., programmed) to operate in a certain manner and/or to perform certain operations described herein. Considering embodiments in which hardware-implemented modules are temporarily configured (e.g., programmed), each of the hardware-implemented modules need not be configured or instantiated at any one instance in time. For example, where the hardware-implemented modules comprise a general-purpose processor configured using software, the general-purpose processor may be configured as respective different hardware-implemented modules at different times. Software may accordingly configure a processor, for example, to constitute a particular hardware-implemented module at one instance of time and to constitute a different hardware-implemented module at a different instance of time.

Hardware-implemented modules may provide information to, and receive information from, other hardware-implemented modules. Accordingly, the described hardware-implemented modules may be regarded as being communicatively coupled. Where multiple of such hardware-implemented modules exist contemporaneously, communications may be achieved through signal transmission (e.g., over appropriate circuits and buses) that connect the hardware-implemented modules. In embodiments in which multiple hardware-implemented modules are configured or instantiated at different times, communications between such hardware-implemented modules may be achieved, for example, through the storage and retrieval of information in memory structures to which the multiple hardware-implemented modules have access. For example, one hardware-implemented module may perform an operation, and store the output of that operation in a memory device to which it is communicatively coupled. A further hardware-implemented module may then, at a later time, access the memory device to retrieve and process the stored output. Hardware-implemented modules may also initiate communications with input or output devices, and may operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially, processor-implemented. For example, at least some of the operations of a method may be performed by one or processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., Application Program Interfaces (APIs).)

Electronic Apparatus and System

Example embodiments may be implemented in digital electronic circuitry, or in computer hardware, firmware, software, or in combinations of them. Example embodiments may be implemented using a computer program product, e.g., a computer program tangibly embodied in an information carrier, e.g., in a machine-readable medium for execution by, or to control the operation of, data processing apparatus (e.g., a programmable processor, a computer; or multiple computers).

A computer program may be written in any form of programming language, including compiled or interpreted languages, and it may be deployed in any form, including as a stand-alone program or as a module, subroutine, or other unit suitable for use in a computing environment. A computer program may be deployed to be executed on one computer or on multiple computers at one site or distributed across multiple sites and interconnected by a communication network.

In example embodiments, operations may be performed by one or more programmable processors executing a computer program to perform functions by operating on input data and generating output. Method operations may also be performed by, and apparatus of example embodiments may be implemented as, special purpose logic circuitry, e.g., a field programmable gate array (FPGA) or an application-specific integrated circuit (ASIC).

The computing system may include clients and servers. A client and server are generally remote from each other and typically interact through a communication network. The relationship of client and server arises by virtue of computer programs running on the respective computers and having a client-server relationship to each other. In embodiments deploying a programmable computing system, it will be appreciated that that both hardware and software architectures require consideration. Specifically, it will be appreciated that the choice of whether to implement certain functionality in permanently configured hardware (e.g., an ASIC), in temporarily configured hardware (e.g., a combination of software and a programmable processor), or a combination of permanently and temporarily configured hardware may be a design choice. Below are set out hardware (e.g., machine) and software architectures that may be deployed, in various example embodiments.

Example Machine Architecture and
Machine-Readable Medium (e.g., Storage Device)

Figure 11:
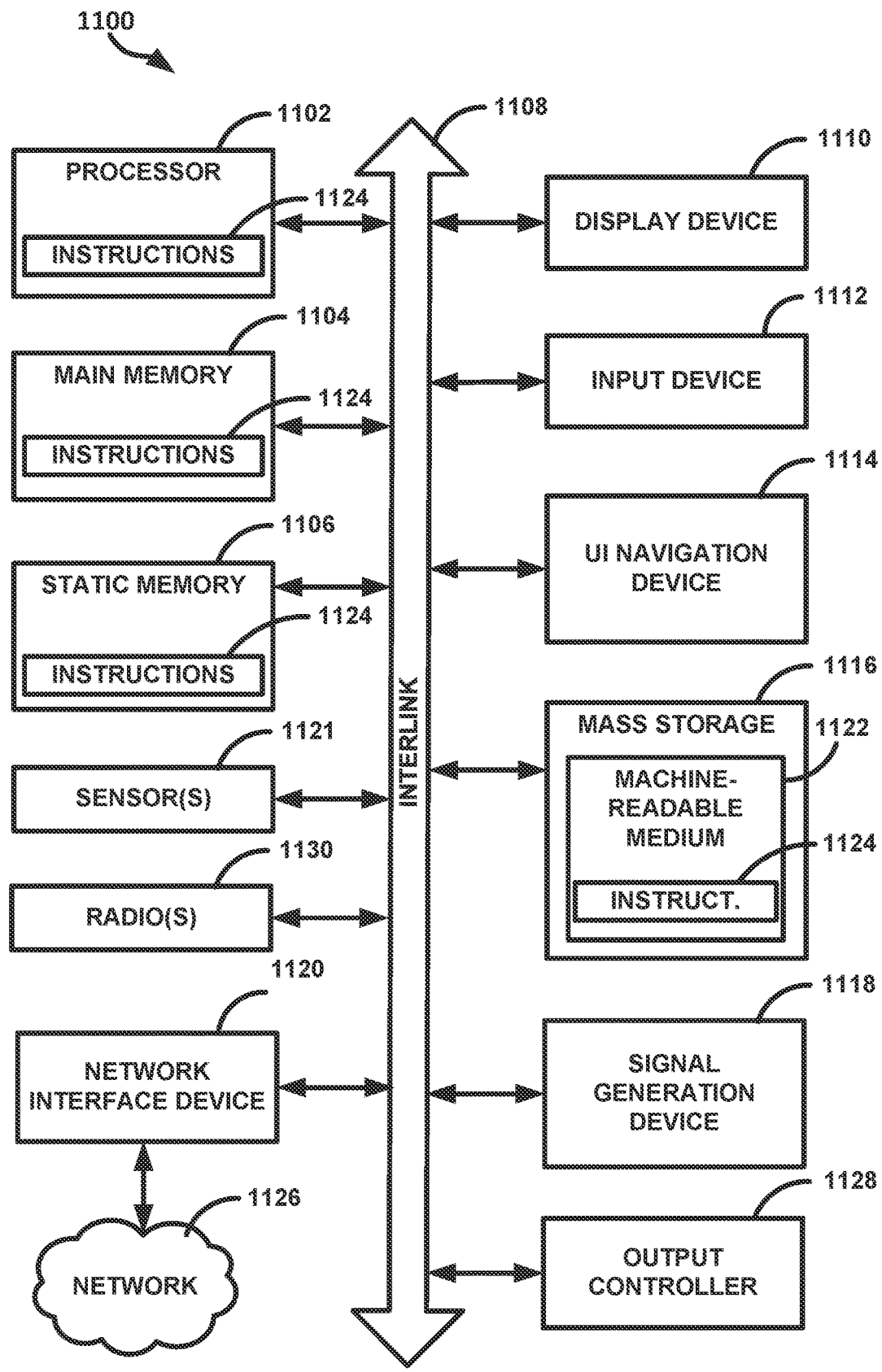
FIG. 11 illustrates, by way of example, a block diagram of an embodiment of a machine in the example form of a computer system within which instructions, for causing the machine to perform any one or more of the methodologies discussed herein, may be executed.

FIG. 11 illustrates, by way of example, a block diagram of an embodiment of a machine in the example form of a computer system 1100 within which instructions, for causing the machine to perform any one or more of the methodologies discussed herein, may be executed. One or more of can be implemented or performed by the computer system 1100. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 1100 includes a processor 1102 (e.g., processing circuitry, such as can include a central processing unit (CPU), a graphics processing unit (GPU), field programmable gate array (FPGA), other circuitry, such as one or more transistors, resistors, capacitors, inductors, diodes, regulators, switches, multiplexers, power devices, logic gates (e.g., AND, OR, XOR, negate, etc.), buffers, memory devices, sensors 11821 (e.g., a transducer that converts one form of energy (e.g., light, heat, electrical, mechanical, or other energy) to another form of energy), such as an IR, SAR, SAS, visible, or other image sensor, or the like, or a combination thereof), or the like, or a combination thereof), a main memory 1104 and a static memory 1106, which communicate with each other via a bus 1108. The memory 1104, 1106 can store parameters (sometimes called weights) that define operations of the processing circuitry 802 or other component of the system 1100. The computer system 1100 may further include a video display unit 1110 (e.g., a liquid crystal display (LCD) or a cathode ray tube (CRT)). The computer system 1100 also includes an alphanumeric input device 1112 (e.g., a keyboard), a user interface (UI) navigation device 1114 (e.g., a mouse), a disk drive unit 1116, a signal generation device 1118 (e.g., a speaker), a network interface device 1120, and radios 1130 such as Bluetooth, WWAN, WLAN, and NFC, permitting the application of security controls on such protocols.

The machine 1100 as illustrated includes an output controller 1128. The output controller 1128 manages data flow to/from the machine 1100. The output controller 1128 is sometimes called a device controller, with software that directly interacts with the output controller 1128 being called a device driver.

Machine-Readable Medium

The disk drive unit 1116 includes a machine-readable medium 1122 on which is stored one or more sets of instructions and data structures (e.g., software) 1124 embodying or utilized by any one or more of the methodologies or functions described herein. The instructions 1124 may also reside, completely or at least partially, within the main memory 1104, the static memory 1106, and/or within the processor 1102 during execution thereof by the computer system 1100, the main memory 1104 and the processor 1102 also constituting machine-readable media.

While the machine-readable medium 1122 is shown in an example embodiment to be a single medium, the term "machine-readable medium" may include a single medium or multiple media (e.g., a centralized or distributed database, and/or associated caches and servers) that store the one or more instructions or data structures. The term "machine-readable medium" shall also be taken to include any tangible medium that is capable of storing, encoding or carrying instructions for execution by the machine and that cause the machine to perform any one or more of the methodologies of the present invention, or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including by way of example semiconductor memory devices, e.g., Erasable Programmable Read-Only Memory (EPROM), Electrically Erasable Programmable Read-Only Memory (EEPROM), and flash memory devices; magnetic disks such as internal hard disks and removable disks; magneto-optical disks; and CD-ROM and DVD-ROM disks.

Transmission Medium

The instructions 1124 may further be transmitted or received over a communications network 1126 using a transmission medium. The instructions 1124 may be transmitted using the network interface device 1120 and any one of a number of well-known transfer protocols (e.g., HTTP). Examples of communication networks include a local area network ("LAN"), a wide area network ("WAN"), the Internet, mobile telephone networks, Plain Old Telephone (POTS) networks, and wireless data networks (e.g., WiFi and WiMax networks). The term "transmission medium" shall be taken to include any intangible medium that is capable of storing, encoding, or carrying instructions for execution by the machine, and includes digital or analog communications signals or other intangible media to facilitate communication of such software.

Additional Example

Example 1 can include a computer-implemented method for tolling operations, the method can include receiving, from a laser scan device of a tolling station, a time series of distance measurements, determining, based on the time series of distance measurements, height measurements indicating a height of a vehicle from a surface of a road, generating, based on the height measurements, an image of the height measurements, and classifying, using the image as input to a convolutional neural network (CNN), the vehicle.

In Example 2, Example 1 can further include generating a toll charge based on the classification.

In Example 3, at least one of Examples 1-2 can further include, wherein generating the image of the height measurements includes interpolating a height measurement for which there is no height measurement.

In Example 4, Example 3 can further include generating a bit map in which each entry of the bit map indicates whether the entry is interpolated or part of the height measurements.

In Example 5, at least one of Examples 1-4 can further include, wherein the image includes rows and columns of pixels, height measurements across the rows indicate different locations across the road at about a same time, height measurements down the columns indicate different times at the same location.

In Example 6, at least one of Examples 1-5 can further include determining the vehicle is present in the road by determining the height measurement is greater than a height measurement of the road.

In Example 7, at least one of Examples 1-6 can further include receiving, for a specified location in the road, respective distance measurements from respective laser scanners, including the laser scanner, and selecting the distance measurement that is not interpolated and is greater.

In Example 8, at least one of Examples 1-7 can further include, in supervised training of the CNN, using a label generated by a prior classification system.

In Example 9, Example 8 can further include correcting noise in the label using an informed pseudo-label technique resulting in a corrected label and training the CNN using the corrected label.

In Example 10, at least one of Examples 1-9 can further include using a clustering autoencoder to detect drift in the CNN and further training the CNN to adjust for the drift.

In Example 11, at least one of Examples 1-10 can further include, based on the height measurements, cropping the image to include only a single vehicle and wherein the image is of the single vehicle.

Example 12 can include a (non-transitory) machine-readable medium including instructions that, when executed by a machine, cause the machine to perform the method of at least one of Examples 1-11.

Example 13 can include a system comprising processing circuitry, and a memory device coupled to the processing circuitry, the memory device including instructions that, when executed by the processing circuitry, cause the processing circuitry to perform the method of at least one of Examples 1-11.

Although teachings have been described with reference to specific example teachings, it will be evident that various modifications and changes may be made to these teachings without departing from the broader spirit and scope of the teachings. Accordingly, the specification and drawings are to be regarded in an illustrative rather than a restrictive sense. The accompanying drawings that form a part hereof, show by way of illustration, and not of limitation, specific teachings in which the subject matter may be practiced. The teachings illustrated are described in sufficient detail to enable those skilled in the art to practice the teachings disclosed herein. Other teachings may be utilized and derived therefrom, such that structural and logical substitutions and changes may be made without departing from the scope of this disclosure. This Detailed Description, therefore, is not to be taken in a limiting sense, and the scope of various teachings is defined only by the appended claims, along with the full range of equivalents to which such claims are entitled.

What is claimed is:

1. A computer-implemented method for tolling operations, the method comprising:
   receiving, from a laser scan device of a tolling station, a time series of distance measurements;
   determining, based on the time series of distance measurements, height measurements indicating a height of a vehicle from a surface of a road;
   generating, based on the height measurements, an image of the height measurements, the image including respective rows and respective columns of pixels, height measurements across the respective rows indicate different locations across the road at about a same time and height measurements down the respective columns indicate different times at the same location; and
   classifying, using the image as input to a convolutional neural network (CNN), the vehicle.

2. The method of claim 1, further comprising generating a toll charge based on the classification.

3. The method of claim 1, wherein generating the image of the height measurements includes interpolating a height measurement for which there is no height measurement.

4. The method of claim 3, further comprising generating a bit map in which each entry of the bit map indicates whether the entry is interpolated or part of the height measurements.

5. The method of claim 1, further comprising determining the vehicle is present in the road by determining the height measurement is greater than a height measurement of the road.

6. The method of claim 1, further comprising:
   receiving, for a specified location in the road, respective distance measurements from respective laser scanners, including the laser scan device; and
   selecting the distance measurement that is not interpolated and is greater.

7. The method of claim 1, further comprising, in supervised training of the CNN, using a label generated by a prior classification system.

8. The method of claim 7, further comprising correcting noise in the label using an informed pseudo-label technique resulting in a corrected label and training the CNN using the corrected label.

9. The method of claim 1, further comprising using a clustering autoencoder to detect drift in the CNN and further training the CNN to adjust for the drift.

10. The method of claim 1, further comprising, based on the height measurements, cropping the image to include only a single vehicle and wherein the image is of the single vehicle.

11. A non-transitory machine-readable medium including instructions that, when executed by a machine, cause the machine to perform operations comprising:
    receiving, from a laser scan device of a tolling station, a time series of distance measurements;
    determining, based on the time series of distance measurements, height measurements indicating a height of a vehicle from a surface of a road;

generating, based on the height measurements, an image of the height measurements, the image including respective rows and respective columns of pixels, height measurements across the respective rows indicate different locations across the road at about a same time and height measurements down the respective columns indicate different times at the same location; and classifying, using the image as input to a convolutional neural network (CNN), the vehicle.

12. The non-transitory machine-readable medium of claim 11, wherein the operations further comprise generating a toll charge based on the classification.

13. The non-transitory machine-readable medium of claim 11, wherein generating the image of the height measurements includes interpolating a height measurement for which there is no height measurement.

14. The non-transitory machine-readable medium of claim 13, wherein the operations further comprise generating a bit map in which each entry of the bit map indicates whether the entry is interpolated or part of the height measurements.

15. A system comprising:
processing circuitry; and
a memory device coupled to the processing circuitry, the memory device including instructions that, when executed by the processing circuitry, cause the processing circuitry to perform operations comprising:
receiving, from a laser scan device of a tolling station, a time series of distance measurements;
determining, based on the time series of distance measurements, height measurements indicating a height of a vehicle from a surface of a road;
generating, based on the height measurements, an image of the height measurements, the image including respective rows and respective columns of pixels, height measurements across the respective rows indicate different locations across the road at about a same time and height measurements down the respective columns indicate different times at the same location; and
classifying, using the image as input to a convolutional neural network (CNN), the vehicle.

16. The system of claim 15, wherein the operations further comprise determining the vehicle is present in the road by determining the height measurement is greater than a height measurement of the road.

17. The system of claim 15, wherein the operations further comprise:
receiving, for a specified location in the road, respective distance measurements from respective laser scanners, including the laser scan device; and
selecting the distance measurement that is not interpolated and is greater.

18. The system of claim 15, wherein the operations further comprise, in supervised training of the CNN, using a label generated by a prior classification system.

* * * * *